United States Patent
Luo (10) Patent No.: US 9,231,486 B2
(45) Date of Patent: Jan. 5, 2016

(54) SYSTEM AND METHOD FOR INFORMATION COMMUNICATION BETWEEN ELECTRICALLY ISOLATED CIRCUITS

(71) Applicant: General Electric Company, Schenectady, NY (US)

(72) Inventor: Wen Luo, Shanghai (CN)

(73) Assignee: General Electric Company, Schenectady, NY (US)

( * ) Notice: Subject to any disclaimer, the term of this patent is extended or adjusted under 35 U.S.C. 154(b) by 353 days.

(21) Appl. No.: 13/784,833

(22) Filed: Mar. 5, 2013

(65) Prior Publication Data

US 2014/0254211 A1    Sep. 11, 2014

(51) Int. Cl.
    *H02M 3/335*    (2006.01)
    *H02M 1/32*     (2007.01)
    *H02M 7/12*     (2006.01)

(52) U.S. Cl.
    CPC ............ *H02M 3/33523* (2013.01); *H02M 1/32* (2013.01); *H02M 7/125* (2013.01); *Y02B 70/1475* (2013.01)

(58) Field of Classification Search
    CPC .............. H02M 1/32; H02M 3/33523; H02M 3/33507; H02M 3/33546; H02M 3/33553
    USPC ......... 363/16, 17, 21.12, 21.15, 21.16, 56.01, 363/56.02, 56.05, 97, 98
    See application file for complete search history.

(56) References Cited

U.S. PATENT DOCUMENTS

| | | | |
|---|---|---|---|
| 6,088,244 A * | 7/2000 | Shioya et al. | ............... 363/21.07 |
| 6,813,170 B2 | 11/2004 | Yang | |
| 6,882,548 B1 | 4/2005 | Jacobs et al. | |
| 7,116,563 B2 | 10/2006 | Hua | |
| 7,236,086 B1 | 6/2007 | Vinciarelli et al. | |
| 7,375,994 B2 | 5/2008 | Andreycak | |
| 7,764,516 B2 | 7/2010 | Yang | |
| 7,881,082 B2 * | 2/2011 | Sato | ................................. 363/97 |
| 8,031,494 B2 | 10/2011 | Brkovic | |
| 8,233,293 B2 | 7/2012 | Selvaraju et al. | |
| 8,274,805 B2 | 9/2012 | Kim et al. | |
| 8,520,345 B2 | 8/2013 | Figueroa et al. | |
| 2010/0054790 A1* | 3/2010 | Inukai | ............................. 399/88 |
| 2011/0063879 A1* | 3/2011 | Murata | ....................... 363/21.13 |
| 2014/0268894 A1* | 9/2014 | Shinohara et al. | ............... 363/17 |

* cited by examiner

*Primary Examiner* — Matthew Nguyen
(74) *Attorney, Agent, or Firm* — General Electric Company (57) ABSTRACT

An exemplary power conversion system includes a power converter and a protection circuit coupled with the power converter. The power converter is configured to convert an input power into an output power. The power converter includes an isolator magnetically coupling a primary side and a secondary side and at least one primary switch coupled in series with the primary side. The at least one primary switch is configured to turn on or turn off current to the isolator on the primary side. The protection circuit is coupled to the at least one primary switch. The protection circuit includes a detecting device for detecting switch state of a secondary switch on the secondary side. The detecting device is configured to drive the at least one primary switch according to the detected switch state. A method for operating the power conversion system is also described.

18 Claims, 9 Drawing Sheets

SYSTEM AND METHOD FOR INFORMATION COMMUNICATION BETWEEN ELECTRICALLY ISOLATED CIRCUITS

BACKGROUND

This disclosure generally relates to systems and methods for information communication between electrically isolated circuits.

Power conversion systems are widely used in various fields, for example, a synchronous rectified (SR) flyback converter is widely used in power supply. The SR flyback converter usually has a primary side and a secondary side that are in electrical or galvanic isolation from each other. Due to this isolation, information about the SR flyback converter may be difficult to transfer between the primary side and the secondary side. For example, when a fault occurs in the primary side or the secondary side, it may be difficult for the other side to respond so as to avoid this fault.

Therefore, it is desirable to provide systems and methods to address at least one of the above-mentioned problems.

BRIEF DESCRIPTION

In accordance with one embodiment disclosed herein, a power conversion system is provided. The power conversion system includes a power converter and a protection circuit coupled with the power converter. The power converter is configured to convert an input power into an output power. The power converter includes an isolator magnetically coupling a primary side and a secondary side and at least one primary switch coupled in series with the primary side. The at least one primary switch is configured to turn on or turn off current to the isolator on the primary side. The protection circuit is coupled to the at least one primary switch. The protection circuit includes a detecting device for detecting switch state of a secondary switch on the secondary side. The detecting device is configured to drive the at least one primary switch according to the detected switch state.

In accordance with another embodiment disclosed herein, a method for operating the power conversion system is provided. The method includes detecting a state of a secondary side by a detecting device of a protection circuit and driving at least one primary switch according to the detected state.

In accordance with another embodiment disclosed herein, a power conversion system is provided. The power conversion system includes a primary side and a secondary side coupled in electrical isolation with the primary side. The power conversion system includes an interface circuit on the primary side or the secondary side. The interface circuit is configured to transfer first information regarding at least one primary-side operating state of the primary side to the secondary side or transfer second information regarding at least one secondary-side operating state of the secondary side to the primary side.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a reasonably concise description of these embodiments, not all features of an actual implementation are described in one or more specific embodiments. Unless defined otherwise, technical and scientific terms used herein have the same meaning as is commonly understood by one of ordinary skill in the art to which this disclosure belongs. The terms "first," "second," "third," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having," and variations thereof herein are meant to encompass the items listed thereafter and equivalents thereof as well as additional items. The term "coupled" is used to describe electrical connections or couplings, which may be in a direct or indirect manner. The term "circuit" may include either a single component or a plurality of components, which are either active and/or passive components and may be optionally connected or otherwise coupled together to provide the described function.

As used herein, the terms "may," "can," "may be," and "can be" indicate a possibility of an occurrence within a set of circumstances; a possession of a specified property, characteristic or function; and/or qualify another verb by expressing one or more of an ability, capability, or possibility associated with the qualified verb. Accordingly, usage of "may," "can," "may be," and "can be" indicate that a modified term is apparently appropriate, capable, or suitable for an indicated capacity, function, or usage, while taking into account that in some circumstances, the modified term may sometimes not be appropriate, capable, or suitable. For example, in some circumstances, an event or capacity may be expected, while in other circumstances, the event or capacity may not occur. This distinction is captured by the terms "may," "can," "may be," and "can be".

Figure 1:
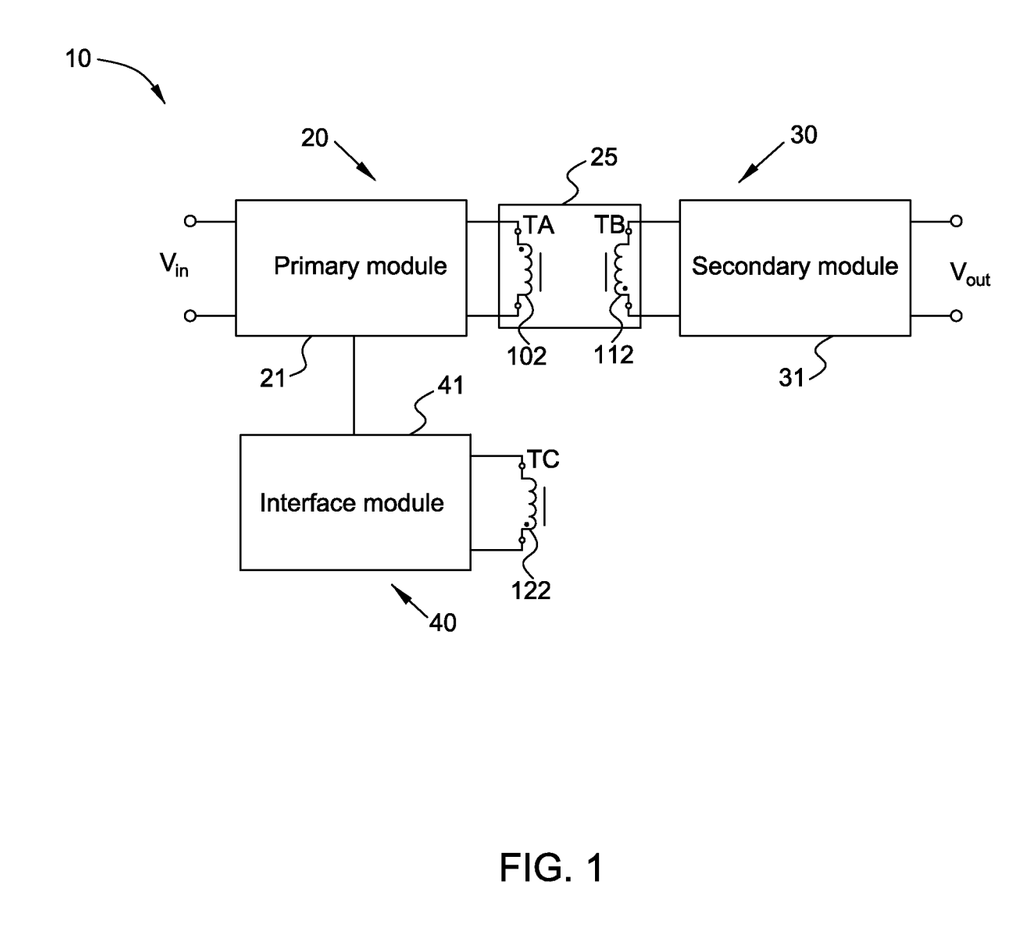
FIG. 1 is a block diagram of a power conversion system in accordance with one exemplary embodiment of the present disclosure.

Referring now to FIG. 1, a block diagram of a power conversion system 10 is illustrated in accordance with an exemplary embodiment of the disclosure. In some embodiments, the power conversion system 10 includes one or more primary circuits at a primary side 20 and one or more secondary circuits at a secondary side 30. The one or more primary circuits are coupled in parallel via electrical isolation. The one or more secondary circuits are coupled in parallel via electrical isolation. The primary side 20 is coupled in electrical isolation from the secondary side 30. For example, the circuits on the primary side 20 versus the secondary side 30 do not share a common ground.

In some embodiments, the primary side 20 and the secondary side 30 are in electrical or galvanic isolation with each other by an isolator 25 (e.g., a transformer). Although energy may be transferred between the primary side 20 and the secondary side 30, it is difficult to have an information communication between the primary side 20 and the secondary side 30 due to this electrical isolation structure.

In one embodiment, an interface circuit 40 is electrically coupled to the secondary side 30 for transferring first information regarding the primary-side operating state of the primary side 20 to the secondary side 30. With the primary-side operating state information obtained from the interface circuit 40, the secondary side 30 would know or infer what is happening on the primary side 20, and take any appropriate actions accordingly.

Alternatively, as shown in FIG. 1, the interface circuit 40 is electrically coupled to the primary side 20 for transferring second information regarding the secondary-side operating state of the secondary side 30 to the primary side 20. With the secondary-side operating state information obtained from the interface circuit 40, the primary side 20 would know or infer what is happening at the secondary side 30, and take any appropriate actions accordingly.

For instance, the interface circuit 40 may include an imitation portion or replica portion for imitating or replicating what is happening on the secondary side of the transformer 25. Then, the interface circuit 40 drives the circuits at the primary side 20 to react properly and counteract any problems occurring on the secondary side 30.

As will be described below in more detail, the primary side 20 is configured to change an operating state of a primary side switch based on the operating conditions of a secondary side switch on the secondary side 30, so as to prevent overcurrent problem from occurring at the primary side 20.

In one particular embodiment of FIG. 1, the isolator 25 includes a primary winding 102 on the primary side 20 and a secondary winding 112 on the secondary side 30. The primary winding 102 is magnetically coupled with the secondary winding 112. In other embodiments, in addition to magnetic coupling, the primary side 20 and the secondary side 30 are electrically isolated in other forms. For example, the primary side 20 and the secondary side 30 is optically coupled through optical transmitting and receiving elements arranged at the primary and secondary sides 20, 30 respectively.

In some embodiments, the primary side 20 includes a primary module 21 electrically coupled to the primary winding 102. The secondary side 30 includes a secondary module 31 electrically coupled to the secondary winding 112.

In some embodiments, the isolator 25 includes a third winding 122 (TC) which is placed in the interface circuit 40. The third winding 122 is magnetically coupled with the primary winding 102 or the secondary winding 112. Although the third winding 122 is similarly configured to have a magnetic coupling, other than energy or power transfer between the primary winding 102 and the secondary winding 112, information is transferred through the magnetic coupling of the third winding 122. Thus, the third winding 122 can also be referred to as a detecting device. In other embodiments, the interface circuit 40 includes other type of detecting device 122 that is configured with the similar function of detecting operating state of the secondary side 30.

The interface circuit 40 is electrically coupled to the primary module 21 by an interface module 41 of the interface circuit 40. In the illustrated embodiment of FIG. 1, the second information of the secondary module 31 is reflected in the interface circuit 40 via the magnetic coupling function of the secondary winding 112 and the third winding 122. Then, the interface circuit 40 outputs signals which are used to operate the primary module 21 corresponding to the second information obtained by the third winding 122.

Therefore, by this way, although the primary side 20 is electrically isolated from the secondary side 30, the second information of the secondary side 30 can be fed back to the primary side 20 via the interface circuit 40.

Figure 2:
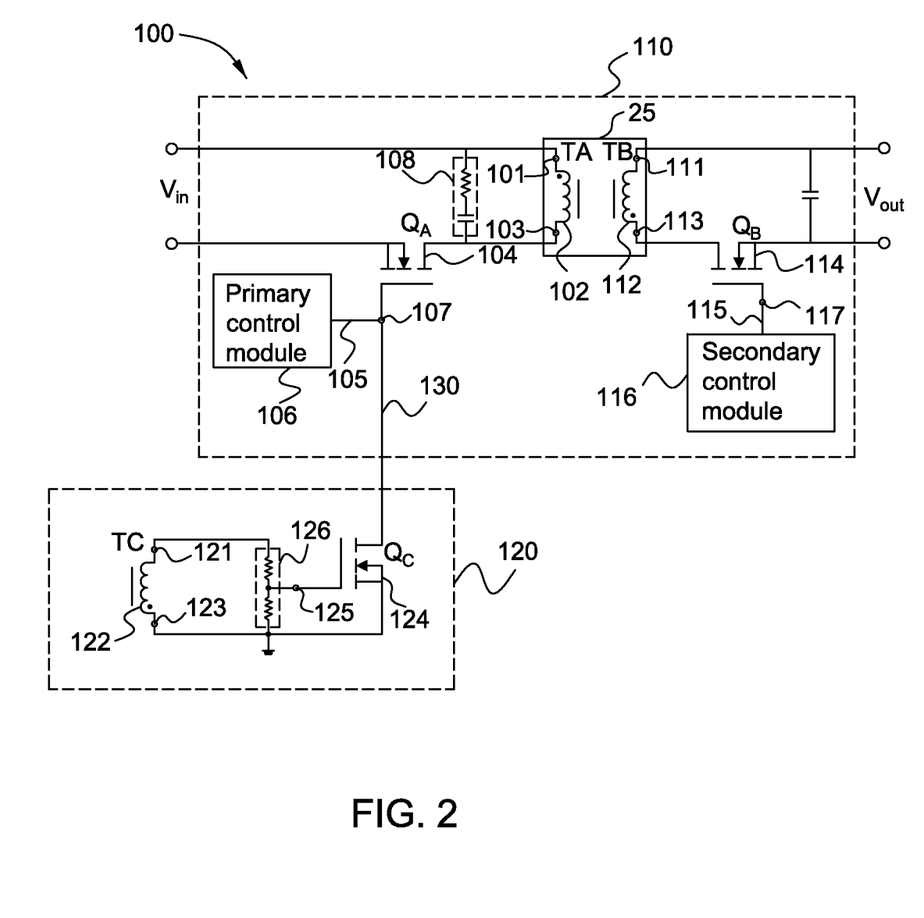
FIG. 2 is a schematic diagram of the power conversion system illustrated in FIG. 1 in accordance with one exemplary embodiment of the present disclosure.

FIG. 2 is a schematic diagram of a power conversion system 100 illustrating a form of an interface circuit 120 shown in FIG. 1 in detail in accordance with one exemplary embodiment of the present disclosure. In this embodiment, the interface circuit 120 is specifically configured to transfer information for initiating actions to protect the power conversion system 100 from overcurrent problems. Thus, the interface circuit 120 can also be referred to as a protection circuit 120. In the illustrated embodiment, the power conversion system 100 includes a power converter 110 which is a synchronous rectified (SR) flyback converter. In other embodiments, the power converter 110 may be arranged to have other topologies.

At primary side, an isolator 25 (e.g., a transformer 25) of the power converter 110 includes a primary winding 102 (TA) and a secondary winding 112 (TB). At primary side, at least one primary switch 104 is coupled in series with the primary winding 102. At secondary side, a secondary switch 114 ($Q_B$) is coupled in series with the secondary winding 112. The primary side is magnetically coupled to the secondary side via the primary winding 102 and the secondary winding 112. In the illustrated embodiment, the at least one primary switch 104 includes a single primary switch ($Q_A$).

In this embodiment of the power converter 110 shown in FIG. 2, a first terminal 101 of the primary winding 102 and a second terminal 113 of the secondary winding 112 are the dotted terminals (i.e., terminals having the same polarity of induction electromotive force). Non-limiting examples of the single primary switch 104 and the secondary switch 114 may include a metal-oxide-semiconductor field-effect transistor (MOSFET), an insulated gate bipolar transistor (IGBT), and any other suitable devices. In a more specific embodiment of FIG. 2, the at least one primary switch 104 and the secondary switch 114 are MOSFETs.

In some embodiments, when an input power source is a DC power source, the power converter 110 shown in FIG. 2 is configured to convert a DC power into another DC power. In some embodiments, when the input power source is an AC power source, a rectifier (not shown) is further coupled between the input power source and the primary circuit of the power converter 110. In this embodiment, the power converter 110 is configured to convert an AC power into a DC power.

In some embodiments, the power converter 110 may include a snubber circuit 108 coupled in parallel with the primary winding 102 for absorbing an additional power in the primary winding 102 due to a large leakage inductance of the primary winding 102. In some embodiments, the snubber circuit 108 includes a resistor and a capacitor coupled in series. In other embodiments, any other forms of snubber circuit can be used to achieve the functions as described herein.

The power conversion system 100 further includes a primary control module 106 which is in electrical communication with the single primary switch 104. The power conversion system 100 also includes a secondary control module 116 which is in electrical communication with the secondary switch 114. In some embodiments, the primary control module 106 and the secondary control module 116 are implemented by a single component. In some embodiments, the primary control module 106 and the secondary control module 116 are implemented by two separate components.

The primary control module 106 and the secondary control module 116 may include any suitable programmable circuits or devices such as a digital signal processor (DSP), a field programmable gate array (FPGA), a programmable logic controller (PLC), and an application specific integrated circuit (ASIC). In some embodiments, the primary control module 106 and the secondary control module 116 are implemented in the form of hardware, software, or a combination of hardware and software. How the power converter 110 is operated according to the control signals provided by the primary control module 106 will be described in detail below.

The primary control module 106 is configured to generate primary switch control signal 105 for providing to a gate terminal 107 of the single primary switch 104. The secondary control module 116 is configured to generate primary switch control signal 115 for providing to a gate terminal 117 of the secondary switch 114. Without the protection circuit 120, the single primary switch 104 and the secondary switch 114 are turned on and turned off according to the primary switch control signal 105 and the secondary switch control signal 115 respectively generated by the primary control module 106.

In order to ensure that the power converter 110 works in a normal operation, at least one of the single primary switch 104 and the secondary switch 114 is turned off. In other words, only one of the single primary switch 104 and the secondary switch 114 should be turned on at a particular time point, or both of the single switch 104 and the secondary switch 114 are turned off at a particular time point. However, sometimes, the single primary switch 104 and the secondary switch 114 may be turned on at the same time due to a voltage spike or some other fault that triggers the primary control module 106.

Figure 3:
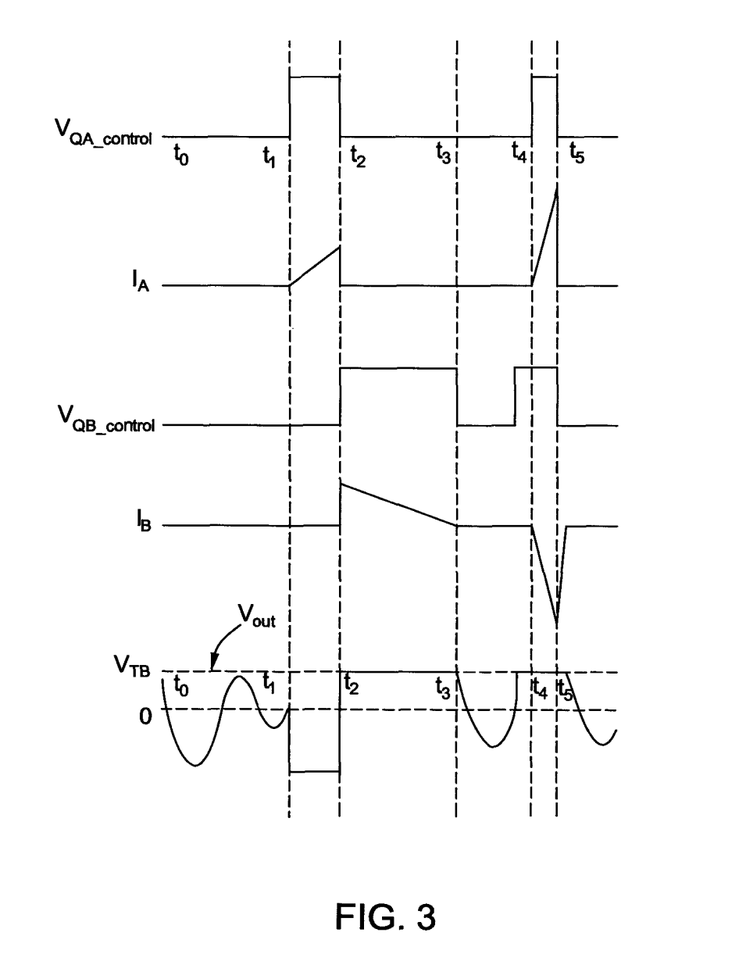
FIG. 3 shows performance curves of the power converter illustrated in FIG. 2 in accordance with one exemplary embodiment of the present disclosure.

FIG. 3 shows performance curves of the power converter 110. As shown in FIG. 3, $V_{QA\_controlmodule}$ and $V_{QB\_controlmodule}$ refer to the primary switch control signal 105 provided to the single primary switch 104 and secondary switch control signal 115 provided the secondary switch 114 respectively. $I_A$ and $I_B$ refer to a primary winding current and a secondary winding current respectively. $V_{TA}$ and $V_{TB}$ refer to primary winding voltage and secondary winding voltage respectively. FIG. 3 shows that the power converter 110 works in a normal operation from time $t_0$ to $t_4$ and works in a fault operation from time $t_4$ to $t_5$.

More specifically, when the power converter 110 is working in the normal operation, from time $t_1$ to $t_2$, the single primary switch $Q_A$ 104 receives a turn-on signal and the secondary switch $Q_B$ 114 receives a turn-off signal. In this case, power from the input power source is stored in the primary winding 102 and the primary winding current $I_A$ rises slowly. The secondary winding current $I_B$ is substantially zero. The primary winding voltage $V_{TA}$ is equal to the input power source voltage $V_{in}$. The secondary winding voltage $V_{TB}$ can be expressed by the following equation:

$$V_{TB} = -\frac{N_B}{N_A} V_{TA} = -\frac{N_B}{N_A} V_{in} \quad (1)$$

where $N_A$ is the number of turns of the primary winding and $N_B$ is the number of turns of the secondary winding.

When the power converter 110 is working in the normal operation, from time $t_2$ to $t_3$, the single primary switch $Q_A$ 104 receives a turn-off signal and the secondary switch $Q_B$ 114 receives a turn-on signal. In this state, the power stored in the primary winding 102 is transferred to the secondary winding 112 and the secondary winding current $I_B$ declines to zero gradually due to a consumption of a load. Therefore, the SR flyback converter is operated in a discontinuous-conduction mode (DCM). In other embodiments, the SR flyback converter is operated in a continuous-conduction mode (CCM). The primary winding current $I_A$ is substantially zero. The secondary winding voltage $V_{TB}$ can be expressed by the following equation:

$$V_{TB} = V_{out} \quad (2)$$

where $V_{out}$ is an output voltage of the power converter 110.

When the power converter 110 is working in the normal operation, from time $t_0$ to $t_1$, both of the single primary switch $Q_A$ 104 and the secondary switch $Q_B$ 114 receive turn-off signals. In this state, the secondary winding voltage $V_{TB}$ is resonating between $$\frac{N_B}{N_A} V_{in}$$

and $$-\frac{N_B}{N_A} V_{in}.$$

The resonating amplitude of $V_{TB}$ declines with time.

When the power converter 110 is working in the normal operation, from time $t_3$ to $t_4$, the single primary switch 104 still receives a turn-off signal just as the previous period from $t_2$ to $t_3$. The secondary switch control signal 115 received by the secondary switch 114 changes from a turn-on signal to a turn-off signal. In this state, due to the DCM operation state and the energy stored in the primary winding 102 and the secondary winding 112 is exhausted, both of the primary winding current $I_A$ and the secondary winding current $I_B$ are zero.

When the power converter 110 is working in the fault operation, from time $t_4$ to $t_5$, both of the single primary switch $Q_A$ 104 and the secondary switch $Q_B$ 114 receive turn-on signals which may be generated due to a fault triggering by the primary control module 106. In this state, the primary winding current $I_A$ is a short-circuit current which increases quickly. The secondary winding current $I_B$ is a reverse current which increases quickly. When this fault happens, the single primary switch 104 and the secondary switch 114 cannot be turned off quickly, thus the primary winding current $I_A$ and the secondary winding current $I_B$ will be large enough to damage components in the power converter 110.

Algorithms and protection circuits for preventing fault control signals are setup or used in the secondary control module 116. However, these methods should be configured to be able to protect the SR flyback converter even when the fault signals cannot be avoided. In order to protect the power converter 110, in one exemplary configuration, a protection circuit 120 is implemented to prevent the power converter 110 from being damaged due to the fault triggered control signals. As shown in FIG. 2, the protection circuit 120 is used as the interface circuit 40 shown in FIG. 1 to transfer the secondary information of the state of the secondary switch 114 to the primary side.

More specifically, according to the turn-on state or turn-off state of the secondary switch 114, the protection circuit 120 generates a first signal and a second signal respectively for operating the single primary switch 104. In a more specific embodiment of FIG. 2, the protection circuit 120 is coupled to the gate terminal 107 of the single primary switch 104 via the switch 124, and configured to avoid the single primary switch 104 from being turned on when the secondary switch 114 is in a turn-on state. In other words, the single primary switch 104 is maintained at a turn-off state even if a turn-on signal is provided from the primary control module 106.

As is shown in FIG. 2, the protection circuit 120 includes a detecting device 122 (e.g., a third winding TC of the isolator 25) and a switch $Q_C$ 124 coupled in parallel with the third winding 122. The detecting device 122 is configured to detect switch state of the secondary switch 114 on the secondary side of the power converter 110. The third winding 122 is magnetically coupled to the primary winding 102 and the secondary winding 112. A first terminal 121 of the third winding 122 and the second terminal 103 of the primary winding 102 are the dotted terminals (i.e., terminals having the same polarity of induction electromotive force). A second terminal 123 is coupled to the ground.

The performance of third winding TC 122 replicates or is proportional to the performance of the secondary winding 112 of the transformer 25. Thus, operating states in association with the secondary winding 112 can be reflected in the output of the third winding 122. The output of TC 122 drives the gate of the switch $Q_C$ 124. Since there is a voltage bias circuit (the voltage dividing module 126) coupled between the third winding 122 and the switch 124, the voltage level of the electrical signal applied at the gate of the switch $Q_C$ 124 will be in a proper voltage range. Together, the third winding TC 122, the voltage dividing module 126, and the switch $Q_C$ 124 are functioning as the protection circuit 120 that imitates or replicates what is happening on the secondary side of the transformer 25. Then the protection circuit 120 drives the at least one primary switch 104 on the primary side 20 to react properly and counteract any problems occurring on the secondary side.

In one embodiment, the third winding 122 provides the switch 124 with electrical signal regarding as the turn-on state or the turn-off state of the secondary switch 114. For example, when the secondary switch 114 is turned on, a voltage induced on the third winding 122 may have a positive sign which can indicate a turn-on state of the secondary switch 114. Similarly, when the secondary switch 114 is turned off, the voltage induced on the third winding 122 may have a negative sign or a resonating sign which can indicate a turn-off state of the secondary circuit. As can be understood, other than using the third winding 122 to obtain the turn-on and turn-off state of the secondary switch 114 through magnetic couplings, in other embodiments, other suitable circuits can be used to detect and obtain the turn-on and turn-off state of the secondary switch 114.

The switch 124 is turned on and turned off according to the electrical signal provided from the third winding 122. The electrical signal may include a voltage signal or a current signal. The protection circuit 120 is coupled with the single primary switch 104 via the switch 124. Thus different signals are generated according to the turn-on state and the turn-off state of the switch 124 and the different signals are provided to the single primary switch 104.

In the illustrated embodiment of FIG. 2, the switch 124 is a voltage-controlled switch, a MOSFET, for example. The switch 124 is coupled with the third winding 122 via a gate terminal 125 (can also be referred to as a control terminal when other type of switch device is used) and a source terminal. A drain terminal of the switch 124 is coupled to the gate terminal 107 of the single primary switch 104 so as to conduct a protection signal 130 to the single primary switch 104. That is, the single primary switch 104 is controlled by a combination of the primary control module 106 and the protection circuit 120.

Figure 4:
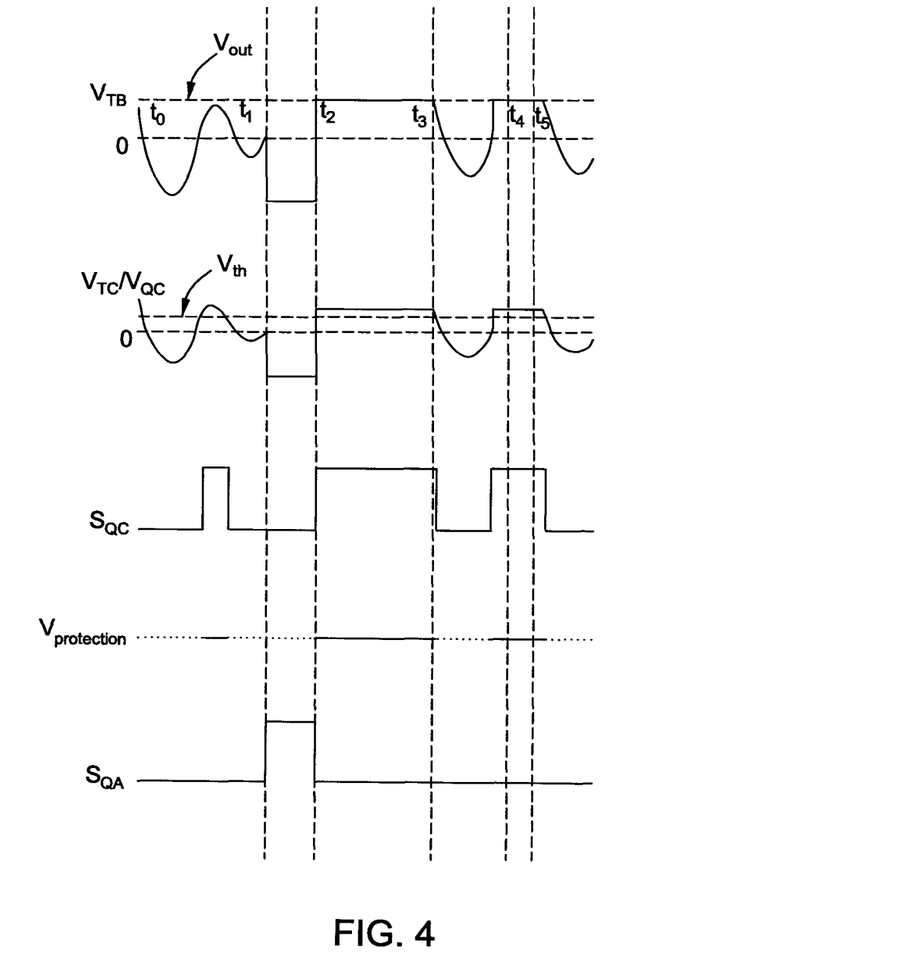
FIG. 4 shows performance curves of the power conversion system illustrated in FIG. 2 in accordance with one exemplary embodiment of the present disclosure.

The performance curves when the protection circuit 120 effects in the power conversion system 100 are shown in FIG. 4. Corresponding to the primary switch control signal $V_{QA\_controlmodule}$ provided by the primary control module 106 and the secondary switch control signal $V_{QB\_controlmodule}$ provided by the secondary control module 116 shown in FIG. 3, the curves of the power conversion system 100 in the normal operation (from time $t_0$ to $t_4$) and the fault operation (from time $t_4$ to $t_5$) are shown in FIG. 4.

As shown in FIG. 4, $V_{TC}$ and $V_{QC}$ refer to a third winding voltage and the electrical signal provided to the switch 124. $S_{QC}$ refers to a switching state of the switch 124. $V_{protection}$ refers to the protection signal 130 provided to the single switching switch 104 by the protection circuit 120. $S_{QA}$ refers to a final switching state of the single primary switch 104, and $S_{QA}$ is a result of the combination of the primary switch control signal $V_{QA\_controlmodule}$ 105 provided by the primary control module 106 and the protection signal $V_{protection}$ 130 provided by the protection circuit 120.

In one case that the secondary switch 114 is in a turn-on state no matter in the normal operation (e.g., during time $t_2$ to $t_3$) or in the fault operation (e.g., during time $t_4$ to $t_5$), the secondary winding voltage $V_{TB}$ is equal to the output voltage $V_{out}$. The third winding voltage $V_{TC}$ is in proportional to $V_{TB}$. In some embodiments, the voltage signal $V_{QC}$ provided to the switch 124 is equal to $V_{TC}$. In some embodiments, a voltage dividing module 126 is further included and coupled between the third winding 122 and the switch 124 for decreasing the amplitude of the voltage signal $V_{QC}$, thus the voltage signal $V_{QC}$ provided to the switch 124 is in proportional to $V_{TC}$.

In a more specific embodiment of FIG. 2, the voltage dividing module 126 includes a first resistor and a second resistor coupled in series. The control terminal 125 of the voltage-controlled switch 124 is coupled to a joint connection between the first resistor and the second resistor.

More specifically, when the voltage signal $V_{QC}$ is higher than a threshold voltage of the switch 124, the switch 124 is turned on. Then an effective low voltage signal (the first signal, see the solid line of $V_{protection}$ shown in FIG. 4) is provided to the single primary switch 104. Due to the low voltage of the gate terminal 107, the single primary switch 104 is kept in a turn-off state. In this state, the single primary switch 104 doesn't respond to the primary switch control signal 105 provided by the primary control module 106. A turn-off state is the switching state of the single primary switch 104.

In another case that the secondary switch 114 is in the turn-off state, from time $t_0$ to $t_2$ in the normal operation for example. During time $t_1$ to $t_2$, the single primary switch 104 receives a turn-on signal from the primary control module 106, the voltage signal $V_{QC}$ provided to the switch 124 is in proportional to $$V_{TB}\left(-\frac{N_B}{N_A}V_{in}\right)$$

which is a negative voltage signal. Then the switch 124 is turned off and an invalid high impedance signal (the second signal, see the dotted line of V$_{protection}$ shown in FIG. 4) is provided to the single primary switch 104. In this state, the protection circuit 120 is cut off from the power converter 110 and has no effect to the power converter 110. Then the single primary switch 104 is controlled according to the primary switch control signal 105 provided by the primary control module 106. A turn-on state is the switching state of the single primary switch 104.

During time $t_0$ to $t_1$, the single primary switch 104 receives a turn-off signal like the secondary switch 114. A resonating voltage V$_{TB}$ and a resonating voltage V$_{TC}$ exist in the secondary winding 112 and the third winding 122 respectively, thus the voltage signal V$_{QC}$ provided to the switch 124 is also a resonating voltage. In this state, when the voltage signal V$_{QC}$ is higher than the threshold voltage of the switch 124, the switch 124 is turned on. The effective low voltage signal is provided to the single primary switch 104, so the single primary switch 104 is kept in the turn-off state. When the voltage signal is lower than the threshold voltage of the switch 124, the switch 124 is turned off. The invalid high impedance signal is provided to the single primary switch 104, so the single primary switch 104 is controlled by the turn-off signal provided by the primary control module 106. Generally, a turn-off state is the switching state of the single primary switch 104.

Therefore, as a whole, with the function of the protection circuit 120, when the secondary switch 114 is in the turn-on state, the single primary switch 104 is kept in a turn-off state. When the secondary switch 114 is in the turn-off state, the single primary switch 104 is controlled according to the primary switch control signal 105 provided by the primary control module 106. Consequently, simultaneous turn-on triggering of the primary switch 114 and the secondary switch 104 can be avoided, thereby overcurrent problems can also be avoided.

Figure 5:
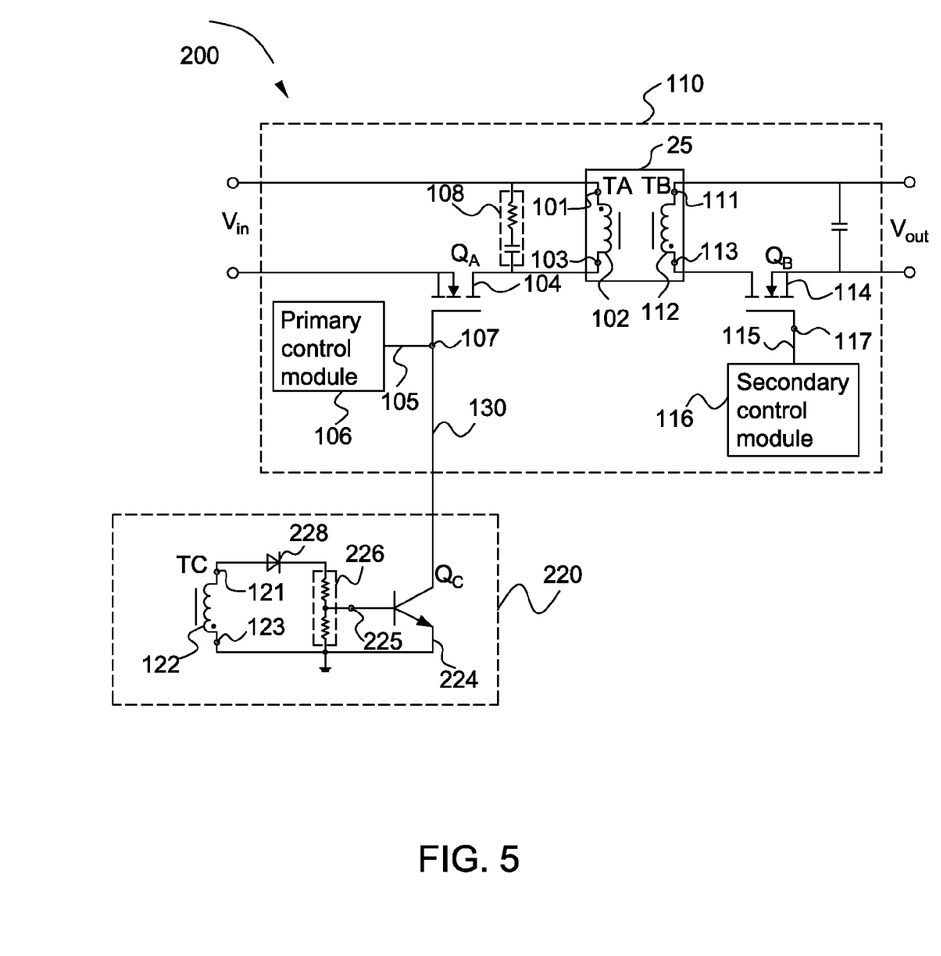
FIG. 5 is a schematic diagram of the power conversion system illustrated in FIG. 1 in accordance with another exemplary embodiment of the present disclosure.

FIG. 5 is a schematic diagram of a power conversion system illustrating a form of an interface circuit shown in FIG. 1 in detail in accordance with another exemplary embodiment of the present disclosure. Similar to the embodiment shown and described with reference to FIG. 2, the power conversion system 200 includes a power converter 110, thus the detailed description of the power converter 110 is omitted here. The power conversion system 200 includes a protection circuit 220 which is different from the protection circuit 120 shown in FIG. 2.

As is shown in FIG. 5, the protection circuit 220 also includes a third winding 122 and a switch 224. However, the switch 224 herein used is a current-controlled switch. In order to keep the switch 224 operate in a safe manner, a diode 228 is included so as to limit a negative voltage signal provided to a control terminal 225 of the switch 224. Further, the diode 228 is configured to keep the current signal provided to the switch 124 a positive current. In some embodiments, in order to ensure the switch 224 is controlled in a normal operation, some resistors 226 are needed in driving the switch 224.

Figure 6:
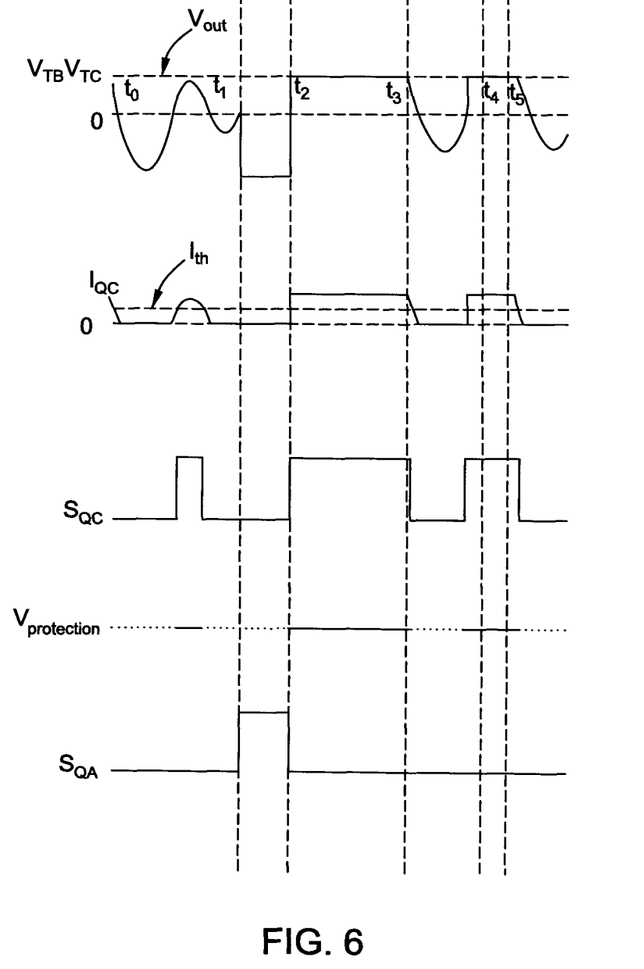
FIG. 6 shows performance curves of the power conversion system illustrated in FIG. 5 in accordance with one exemplary embodiment of the present disclosure.

FIG. 6 shows curves of the power conversion system 200 illustrated in FIG. 5 in accordance with one exemplary embodiment of the present disclosure. Compared with the curves of the power conversion system 100 shown in FIG. 4, instead of providing voltage signal V$_{QC}$ to the switch 124, a current signal I$_{QC}$ is provided to the switch 224 due to the usage of the current-controlled switch 224. As shown in FIG. 6, the current signal I$_{QC}$ is a positive current, and I$_{QC}$ is in proportional to the secondary winding voltage V$_{TB}$ and V$_{TC}$ in the positive part of V$_{TB}$ and V$_{TC}$, and I$_{QC}$ is equal to zero in the negative part of V$_{TB}$ and V$_{TC}$.

Further, the turn-on state and the turn-off state of the switch 224 is based on the comparison result of the current signal I$_{QC}$ with a threshold current of the switch 224. More specifically, when the current signal I$_{QC}$ is higher than the threshold current of the switch 224, the switch 224 is turned on and the effective low voltage signal (the first signal) is provided to the single primary switch 104 to keep the single primary switch 104 in a turn-off state. When the current signal I$_{QC}$ is lower than the threshold current of the switch 224, the switch 224 is turned off and the invalid high impedance signal (the second signal) is provided to the single primary switch 104 to allow the single primary switch 104 to be controlled according to the primary switch control signal 105 provided by the primary control module 106.

Similarly, with the function of the protection circuit 220, when the secondary switch 114 is in the turn-on state, the single primary switch 104 is kept in a turn-off state. When the secondary switch 114 is in the turn-off state, the single primary switch 104 is controlled according to the primary switch control signal 105 provided by the primary control module 106.

Figure 7:
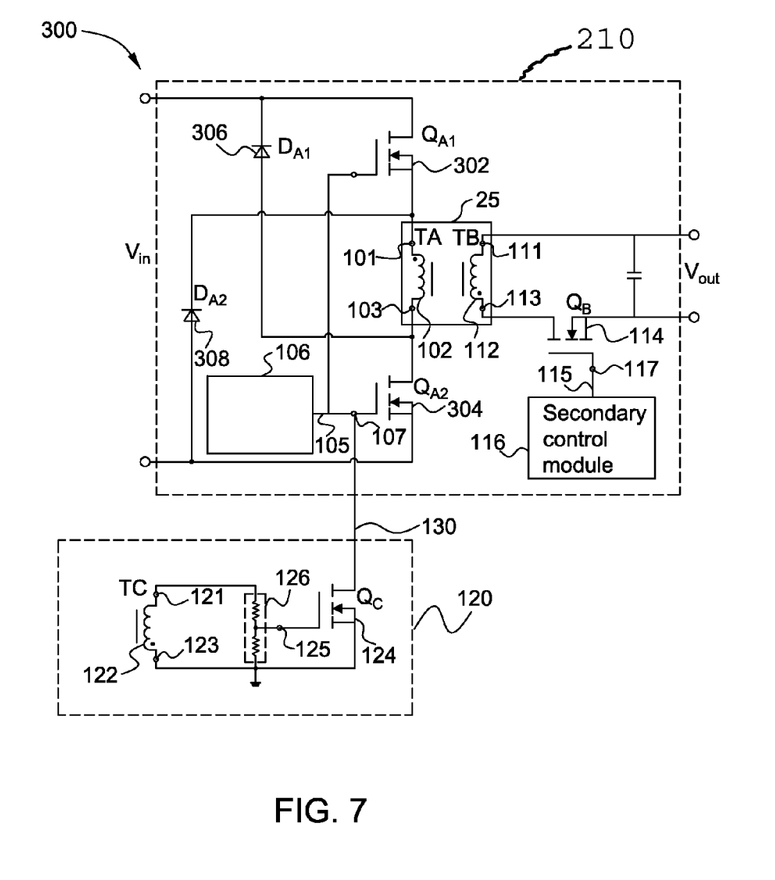
FIG. 7 is a schematic diagram of another embodiment of a power conversion system.

FIG. 7 is a schematic diagram of another embodiment of a power conversion system. Compared with the power conversion system 100 shown in FIG. 2, similarly, the power conversion system 300 includes a power converter 210 and a protection circuit 120. The protection circuit 120 includes a secondary-side transformer TC that is part of the secondary side transformer TB. The number of windings 122 is proportional to the number of windings 112 around TB. For example, the number of windings 122 is equal to the number of windings 112, or one-third less than then number of windings of 112, etc. Then, secondary-side transformer TC mimics or replicates the behavior of secondary-side transformer TB. The amount of current through winding 122 is proportional to the current through winding 112. Accordingly, the protection circuit 120 proportionally mimics or replicates the behavior of the secondary side of the transformer 25. In this manner, protection circuit 120 is able to detect what is occurring on the secondary side of the transformer 25. Protection circuit 120 thus brings the status information about the secondary side to the primary side in order control the primary side appropriately. For instance, if the secondary side is experiencing a large current surge or a fault condition, then secondary side transformer TC experiences the same or similar condition as secondary side transformer TB, and would affect the secondary-side switch 114, and a secondary control module 116 would also operate to either close or open the switch 114. Depending on if there is small or large current surge in the winding 122, the current will flow through the resistor divider 126 and bias the gate 125 of the transistor switch 124 and either open or close the switch 124 to turn OFF or keep ON the primary side circuits, in particular either turn OFF or keep On the primary side switches such as switch 304 and switch 302. The protection circuit 120 thus detects or responds to the conditions of the secondary side and transfers the status to the primary side and acts accordingly to shut OFF the primary side when, for example, a fault condition occurs.

Figure 8:
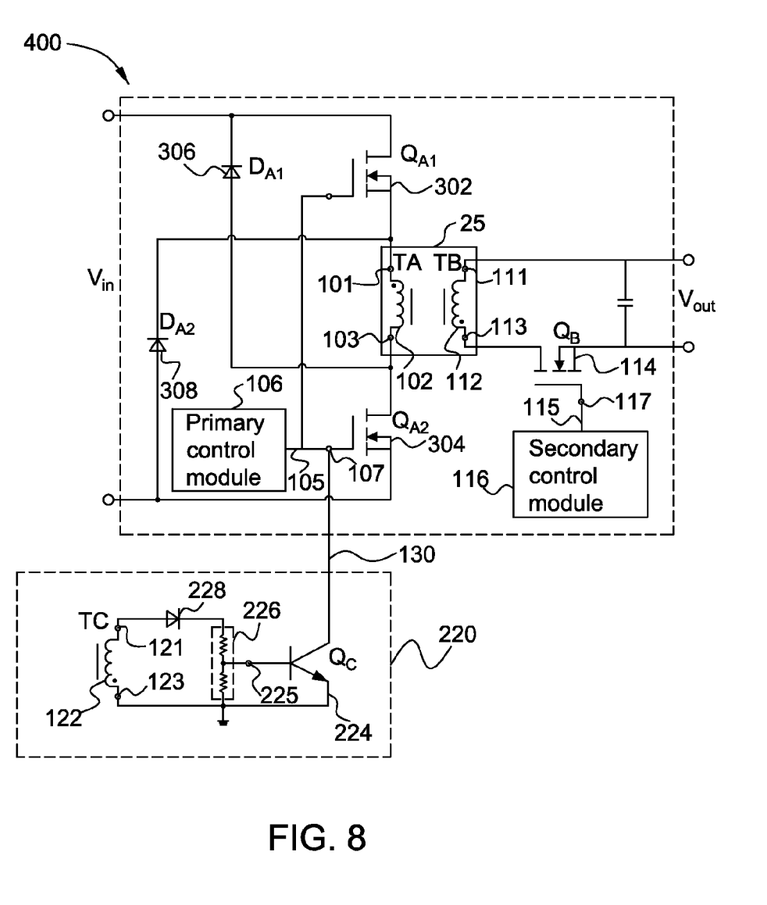
FIG. 8 is a schematic diagram of another embodiment of a power conversion system.

In the protection circuit 120 example of FIG. 7, transistor switch 124 is a voltage-controlled switch MOSFET, but it can also be a bipolar transistor 224 such as depicted in FIG. 8. In one variation, the secondary control module 116 includes a latch such as a Set Reset or SR driver that straddles across the drain and source of transistor 114 to detect a voltage difference between the drain and source of transistor 114. The SR driver (or secondary control module 116) also drives the gate of transistor 114 to either open or close transistor 114. If there is a large voltage differential between the source and drain, there is likely a fault condition, and transistor 114 should be open to prevent a surge of current going to the transformer 25 and the rest of the circuit. The response of the protection circuit 120 is interlocked to the performance of transistor 114. That is, the primary side becomes aware of the situation on the secondary side of transformer 25.

The power converter 210 also includes a primary side and a secondary side. At the secondary side, the power converter 210 still includes a secondary winding 112 magnetically coupled with the primary winding 102. However, at the primary side, the at least one primary switch includes a first primary switch 302 and a second primary switch 304. The first primary switch 302 is coupled in series with the first terminal 101 of the winding 102 and the second primary switch 304 is coupled in series with the second terminal 103 of the winding 102.

Non-limiting examples of the first primary switch 302 and the second primary switch 304 may include a MOSFET, an IGBT, and any other suitable devices. In a more specific embodiment of FIG. 7, the first primary switch 302 and the second primary switch 304 are MOSFETs.

A first primary diode 306 is coupled in parallel with the first primary switch 302 and the primary winding 102. An anode of the first primary diode 306 is coupled with the second terminal 103 of the primary winding 102 and a cathode of the first primary diode 306 is coupled with a drain terminal of the first primary switch 302. A second primary diode 308 is coupled in parallel with the primary winding 102 and the second primary switch 304. An anode of the second primary diode 308 is coupled with a source terminal of the second primary switch 304 and a cathode of the second primary diode 308 is coupled with the first terminal 101 of the primary winding 102.

The first primary diode 306 is configured to allow a reverse current in the second primary switch 304 to flow through. Similarly, the second primary diode 308 is configured to allow a reverse current in the first primary switch 302 to flow through.

In some embodiments, the protection circuit 120 is coupled with a gate terminal (control terminal) of the first primary switch 302, the first primary switch 302 is controlled by a combination of the primary control module 106 and the protection circuit 120, and the second primary switch 304 is controlled by the primary control module 106. With the function of the protection circuit 120, when the secondary switch 114 is in turn-on state, the first primary switch 302 is kept in a turn-off state so that the primary circuit is open-circuited. When the secondary switch 114 is in turn-off state, the first primary switch 302 is controlled according to the primary switch control signal 105 provided by the primary control module 106.

In some embodiments, the protection circuit 120 is coupled with a gate terminal (control terminal) of the second primary switch 304, the second primary switch 304 is controlled by a combination of the primary control module 106 and the protection circuit 120, and the first primary switch 302 is controlled by the primary control module 106. With the function of the protection circuit 120, when the secondary switch 114 is in turn-on state, the second primary switch 304 is kept in a turn-off state so that the primary circuit is open-circuited. When the secondary switch 114 is in turn-off state, the second primary switch 304 is controlled according to the primary switch control signal 105 provided by the primary control module 106.

In some embodiments, the protection circuit 120 is coupled with both of the two gate terminals of the first primary switch 302 and the second primary switch 304. The first primary switch 302 and the second primary switch 304 are controlled by a combination of the primary control module 106 and the protection circuit 120. With the function of the protection circuit 120, when the secondary switch 114 is in turn-on state, the first primary switch 302 and the second primary switch 304 are kept in a turn-off state so that the primary circuit is open-circuited. When the secondary switch 114 is in turn-off state, the first primary switch 302 and the second primary switch 304 are controlled according to the primary switch control signal 105 provided by the primary control module 106.

Performance curves of the power conversion system 300 are similar to the curves of the power conversion system 100 shown in FIG. 3 and FIG. 4. As is shown in FIG. 3, $V_{QA\_controlmodule}$ refers to the primary switch control signal 105 both of the first primary switch 302 and the second primary switch 304. As is shown in FIG. 4, protection signal $V_{protection}$ 130 is provided to either of the first primary switch 302 or the second primary switch 304 or both of the first primary switch 302 and the second primary switch 304 according to which primary switch the protection circuit 130 is coupled to. $S_{QA}$ refers to a switching state of the at least one primary switch (first primary switch 302 or the second primary switch 304) which receives the protection signal $V_{protection}$ 130.

FIG. 8 is a schematic diagram of a power conversion system illustrated in FIG. 1 in accordance with another exemplary embodiment of the present disclosure. Compared with the power conversion system 300 shown in FIG. 7, similarly, the power conversion system 400 includes a power converter 210 and a protection circuit 220. The power converter 210 is the same as what is illustrated in FIG. 7 and the protection circuit 220 is the same as what is illustrated in FIG. 4, therefore, the description of the power converter 210 and the protection circuit 220 are omitted here.

Similarly, the exemplary protection circuit 220 is coupled to at least one of two control terminals of the first primary switch 302 and the second primary switch 304. Performance curves of the power conversion system 400 are similar to the curves of the power conversion system 200 shown in FIG. 3 and FIG. 6. As is shown in FIG. 3, $V_{QA\_controlmodule}$ refer to as the primary switch control signal 105 both of the first primary switch 302 and the second primary switch 304. As is shown in FIG. 6, protection signal $V_{protection}$ 130 is provided to either of the first primary switch 302 or the second primary switch 304 or both of the first primary switch 302 and the second primary switch 304 according to which primary switch of the protection circuit 130 is coupled via the switch 124. $S_{QA}$ refers to a switching state of the at least one primary switch (first primary switch 302 or the second primary switch 304) which receives the protection signal $V_{protection}$ 130.

Figure 9:
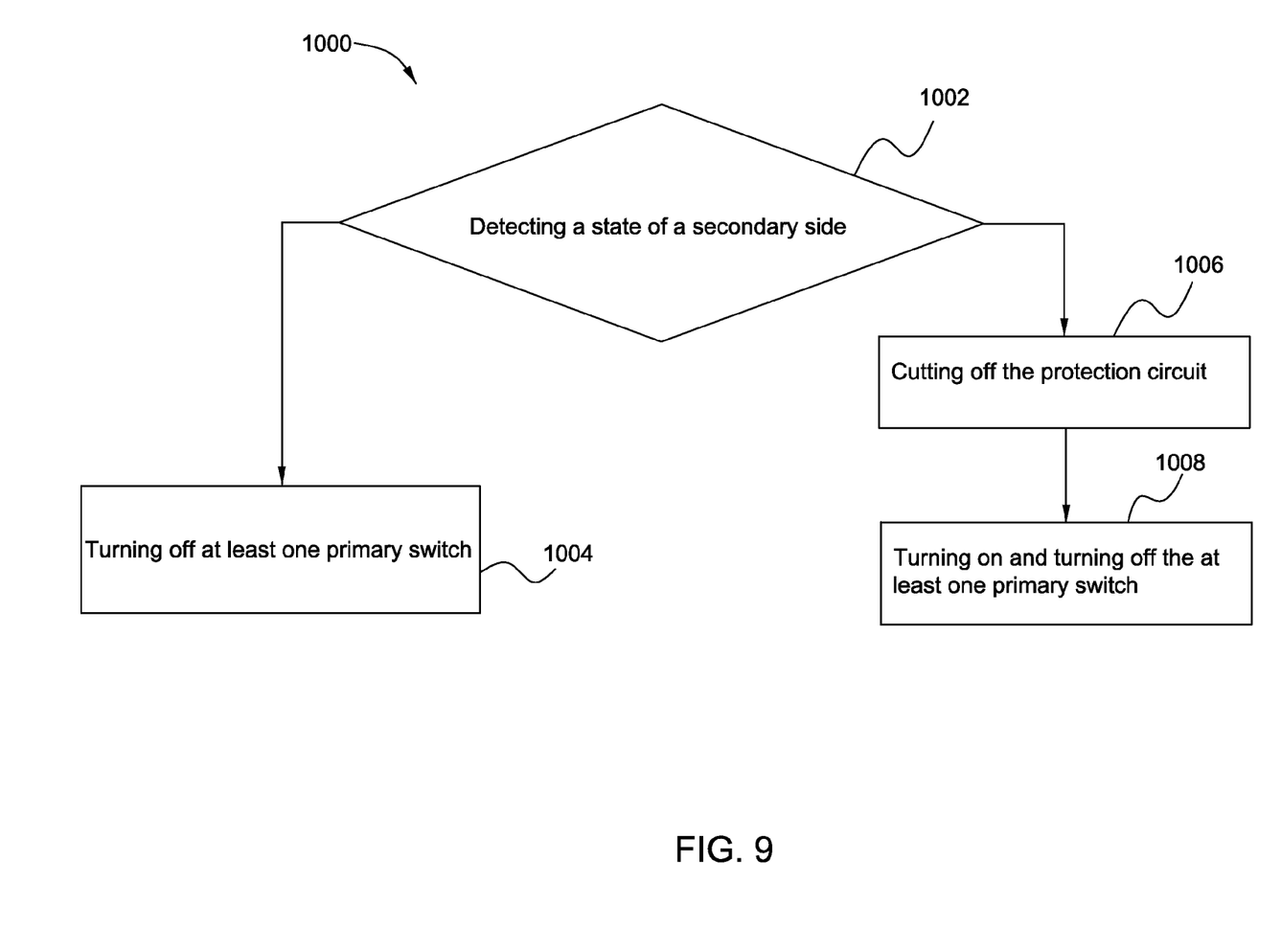
FIG. 9 is a flowchart of a method for operating a power conversion system in accordance with one exemplary embodiment of the present disclosure.

FIG. 9 is a flowchart of a method for operating a power conversion system in accordance with one exemplary embodiment of the present disclosure. Combined with the power conversion system 10 shown in FIG. 1, the method 1000 will be described as follow. The method 1000 starts from block 1002, at block 1002, the state of the secondary side 30 by the interface circuit 40 is detected. Some detecting devices are needed in the interface circuit 40 for detecting the state. In some embodiments, some sensors are used to detect current, voltage signal of the secondary side 30.

Take the power conversion system 100 shown in FIG. 2 or the power conversion system 200 shown in FIG. 5 as an example, the turn-on state and the turn-off state of the secondary switch 114 in the power converter 110 are measured by the third winding 122 in the protection circuit 120. Due to a magnetic induction function of the third winding 120 with the secondary winding 110, the third winding voltage is regarded as the state of the secondary switch 112. More specifically, a positive voltage is generated in proportional to the output voltage by the third winding 120 when the secondary switch 114 is in the turn-on state. Then the process goes to block 1004 or block 1006.

At block 1004, as the power conversion system 100 shown in FIG. 2 or the power conversion system 200 shown in FIG. 5, when the secondary switch 114 of the power converter is in the turn-on state, the at least one primary switch 104 in the power converter is turned off via the protection circuit. In some embodiments, at least one of the first primary switch 302 and the secondary switch 304 in the power conversion system 300 shown in FIG. 7 or the power conversion system 400 shown in FIG. 8 is turned off.

More specifically, at block 1004, the method includes providing an electrical signal to the switch 124 of the protection circuit 120 by the third winding 122 of the protection circuit 120 through magnetic coupling between the primary winding 102 and the third winding 122, the electrical signal representing the turn-on state and the turn-off state of the secondary switch 114, then the switch 124 is turned on or turned off according to the electrical signal.

In some embodiments, when the switch 124 is a voltage-controlled switch, the switch 124 is turned on when the electrical signal is higher than a threshold voltage signal of the switch 124, and the switch 124 is turned off when the electrical signal is lower than the threshold voltage signal of the switch 124. In some embodiments, when the switch 224 is a current-controlled switch, the switch 224 is turned on when the electrical signal is higher than a threshold current signal of the switch 224, and the switch 124 is turned off when the electrical signal is lower than the threshold current signal of the switch 124.

When a voltage dividing module 126 is used in the protection circuit 120, the method includes decreasing the electrical signal provided to the switch 124 by the voltage dividing module 126.

At block 1006, as the power conversion system 300 shown in FIG. 7 or the power conversion system 400 shown in FIG. 8, when the secondary switch in the power converter is in the turn-off state, the protection circuit is cut off from the power converter. The at least one primary switch 104 in the power converter 110 is turned off by the protection circuit 110. Then the process goes to block 1008.

At block 1008, the at least one primary switch 104 is turned on or turned off according to the primary switch control signal 105 provided by the primary control module 106. In some embodiments, at least one of the first primary switch 302 and the second primary switch 304 is turned on or turned off according to the primary switch control signal 105 provided by the primary control module 106.

More specifically, a first signal (effective low voltage signal) is provided to the at least one primary switch 104 for keeping the at least one primary switch 104 of the power converter 110 in a turn-off state during a duration that the secondary switch 114 in the power converter 110 is in the turn-on state. A second signal (invalid high impedance signal) is provided to the at least one primary switch 104 for cutting off the protection circuit 120 from the power converter 110 during a duration that the secondary switch 114 in the power converter 110 is in the turn-off state. Then the at least one primary switch 104 is turned on or turned off according to the primary switch control signal 105 provided by the primary control module 106.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

Further, as will be understood by those familiar with the art, the present invention may be embodied in other specific forms without depending from the spirit or essential characteristics thereof. Accordingly, the disclosures and descriptions herein are intended to be illustrative, but not limiting, of the scope of the invention which is set forth in the following claims.

What is claimed is:

1. A power conversion system, comprising:
   a power converter configured to convert an input power into an output power, wherein the power converter comprises:
   an isolator comprising a primary winding and a secondary winding magnetically coupled to the primary winding, the isolator magnetically coupling a primary side and a secondary side of the power converter; and
   at least one primary switch coupled in series with the primary side, configured to turn on or turn off current to the isolator on the primary side; and
   a protection circuit coupled to the at least one primary switch, wherein the protection circuit comprises:
   a detecting device configured to proportionally replicate a state of the secondary side, and wherein the detecting device is further configured to drive the at least one primary switch according to the detected state of the secondary side,
   a third winding magnetically coupled to the primary winding and configured to provide an electrical signal indicating a turn-on state and a turn-off state of a secondary-side switch, and
   a switch coupled in parallel with the third winding and configured to turn on and turn off according to the electrical signal provided by the third winding.

2. The power conversion system of claim 1, wherein the protection circuit is configured to turn off the at least one primary switch of the power converter when a secondary switch on the secondary side is in the turn-on state.

3. The power conversion system of claim 1, wherein the protection circuit is configured to allow the at least one primary switch of the power converter to be controlled according to a primary switch control signal provided by a primary control module when the secondary side experiences a fault state.

4. The power conversion system of claim 1, wherein
   when the switch is turned on, a first signal is provided to the at least one primary switch for keeping the at least one primary switch in a turn-off state; and
   when the switch is turned off, a second signal is provided to the at least one primary switch to allow the at least one primary switch to be switched on and off according to the primary switch control signal provided by the primary control module.

5. The power conversion system of claim 1, wherein the switch is a voltage-controlled switch, the electrical signal provided to the switch comprises a voltage signal, the switch is turned on when the voltage signal is higher than a threshold voltage of the switch, and the switch is turned off when the voltage signal is lower than the threshold voltage signal of the switch.

6. The power conversion system of claim 1, wherein the protection circuit comprises a voltage divider coupled between the third winding and the switch for decreasing an amplitude of the electrical signal provided to the switch.

7. The power conversion system of claim 1, wherein the switch is a current-controlled switch, the electrical signal provided to the switch comprises a current signal, the switch is turned on when the current signal is higher than a threshold current of the switch, and the switch is turned off when the current signal is lower than the threshold current of the switch.

8. The power conversion system of claim 1, wherein the at least one primary switch comprises a first primary switch and a second primary switch coupled in series with a first terminal and a second terminal of the primary winding respectively, wherein the protection circuit is coupled with at least one of the first primary switch and the second primary switch, and configured to operate at least one of the first primary switch and the second primary switch according to the turn-on state and turn-off state of the secondary-side switch.

9. A method for operating an isolated power conversion system, the method comprising:
   detecting a fault state of a secondary side of the isolated power conversion system by coupling a detecting device of a protection circuit to the secondary side, the protection circuit driving a primary side of the isolated power conversion system;
   driving at least one primary switch according to the detected fault state;
   providing an electrical signal to a switch of the protection circuit by a third winding of the protection circuit through magnetic coupling of a primary winding of a power converter of the isolated power conversion system to the third winding, the electrical signal representing a turn-on state and a turn-off state of a secondary switch of the power converter; and
   turning on and turning off the switch according to the electrical signal.

10. The method of claim 9, comprising:
   turning off the at least one primary switch of the power converter by the protection circuit when the secondary switch is in the turn-on state.

11. The method of claim 9, comprising:
   cutting off the protection circuit from the power converter when the secondary switch in the power converter is in the turn-off state; and
   turning on and turning off the at least one primary switch according to a primary switch control signal provided by a primary control module.

12. The method of claim 11, comprising: providing a first signal to the at least one primary switch to keep the at least one primary switch of the power converter in a turn-off state during a duration that the secondary switch in the power converter is in the turn-on state;
   providing a second signal to the at least one primary switch to cut off the protection circuit from the power converter during a duration that the secondary switch in the power converter is in the turn-off state; and
   turning on and off the at least one primary switch according to the primary switch control signal provided by the primary control module.

13. The method of claim 11, wherein the switch is a voltage-controlled switch, and turning on and turning off the switch comprises:
   turning on the switch when the electrical signal is higher than a threshold voltage signal of the switch; and
   turning off the switch when the electrical signal is lower than the threshold voltage signal of the switch.

14. The method of claim 11, wherein the switch is a current-controlled switch, and turning on and turning off the switch comprises:
   turning on the switch when the electrical signal is higher than a threshold current signal of the switch; and
   turning off the switch when the electrical signal is lower than the threshold current signal of the switch.

15. The method of claim 10, comprising operating at least one of a first primary switch and a second primary switch by the protection circuit according to the turn-on state and turn-off state of the secondary switch.

16. A power conversion system, comprising:
   a primary side and a secondary side coupled in electrical isolation from the primary side; and
   an interface circuit coupled to the primary side and the secondary side, the interface circuit comprising:
      a third winding magnetically coupled to the primary side and configured to transfer first information regarding at least one primary-side operating state of the primary side to the secondary side or transfer second information regarding at least one secondary-side operating state of the secondary side to the primary side, and
      a switch coupled in parallel with the third winding and configured to turn on and turn off according to the first information or the second information.

17. The power conversion system of claim 16, wherein:
   a primary module is electrically coupled to a primary winding at the primary side;
   a secondary winding is magnetically coupled to the primary winding and a secondary module is electrically coupled to the secondary winding; and
   the interface circuit is configured to transfer the first and second information between the primary module and the secondary module.

18. The power conversion system of claim 17, wherein:
   the primary module comprises at least one primary switch; and
   the secondary module comprises a secondary switch, wherein the interface circuit is configured to transfer the first information regarding a turn-on state of the secondary switch to the primary module to allow the at least one primary switch to be switched off according to the turn-on state first information.

* * * * *